Dec. 24, 1935.                    H. T. HUNTER                    2,025,685
                                COOKING MACHINE
                        Filed Feb. 7, 1933            8 Sheets-Sheet 3
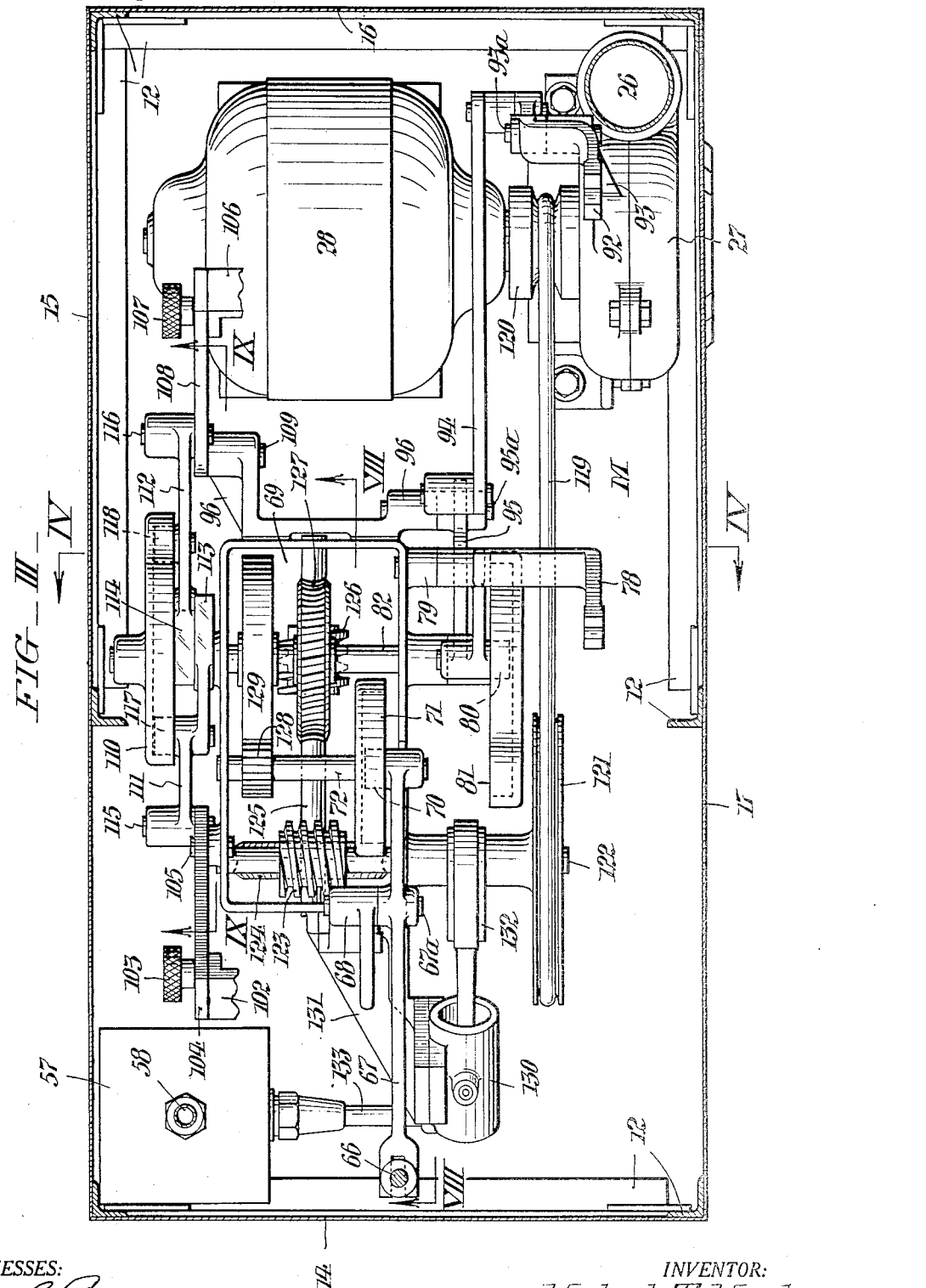
WITNESSES:                                                INVENTOR:
                                                      Herbert T. Hunter,
                                                  BY
                                                            ATTORNEYS.

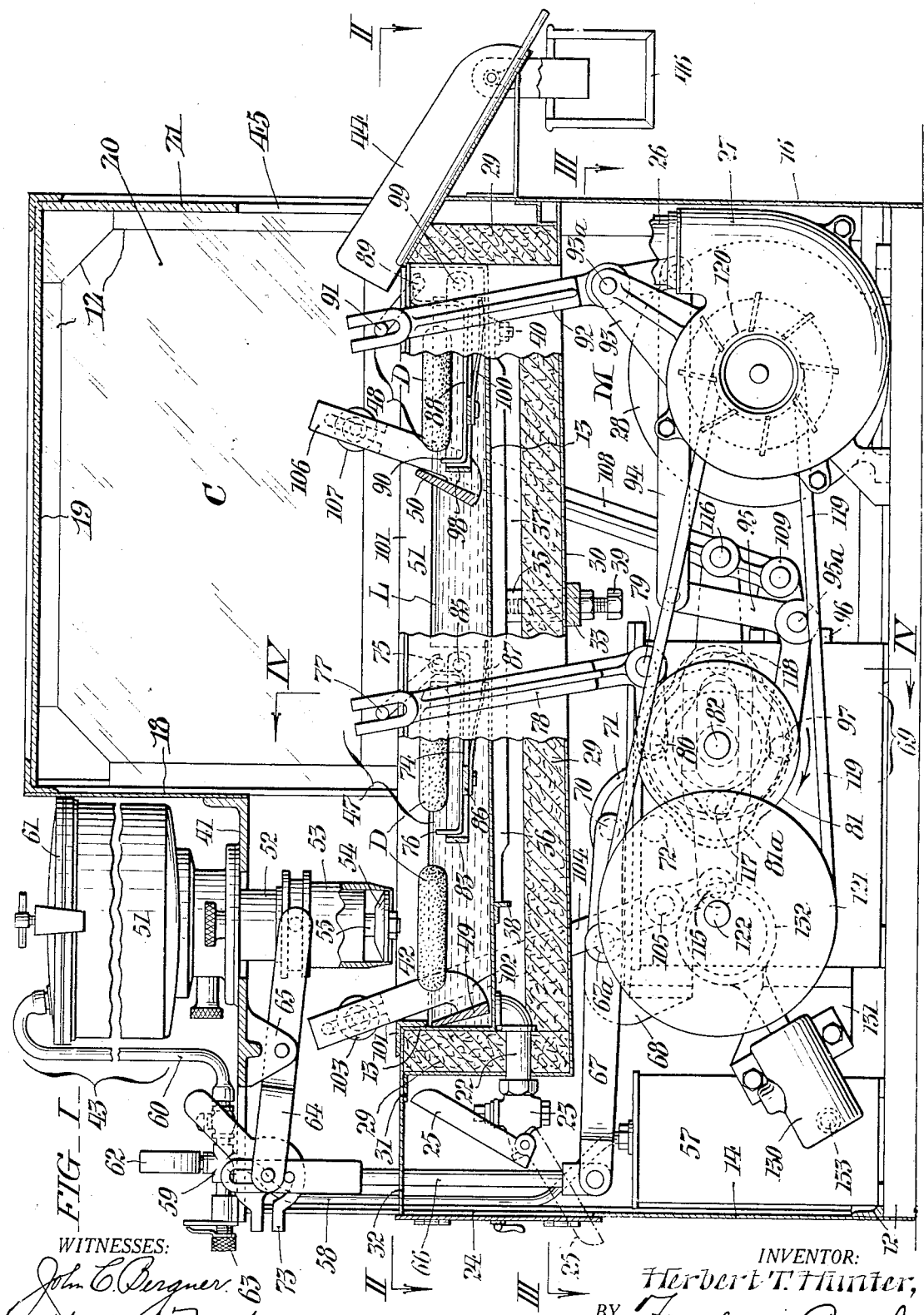

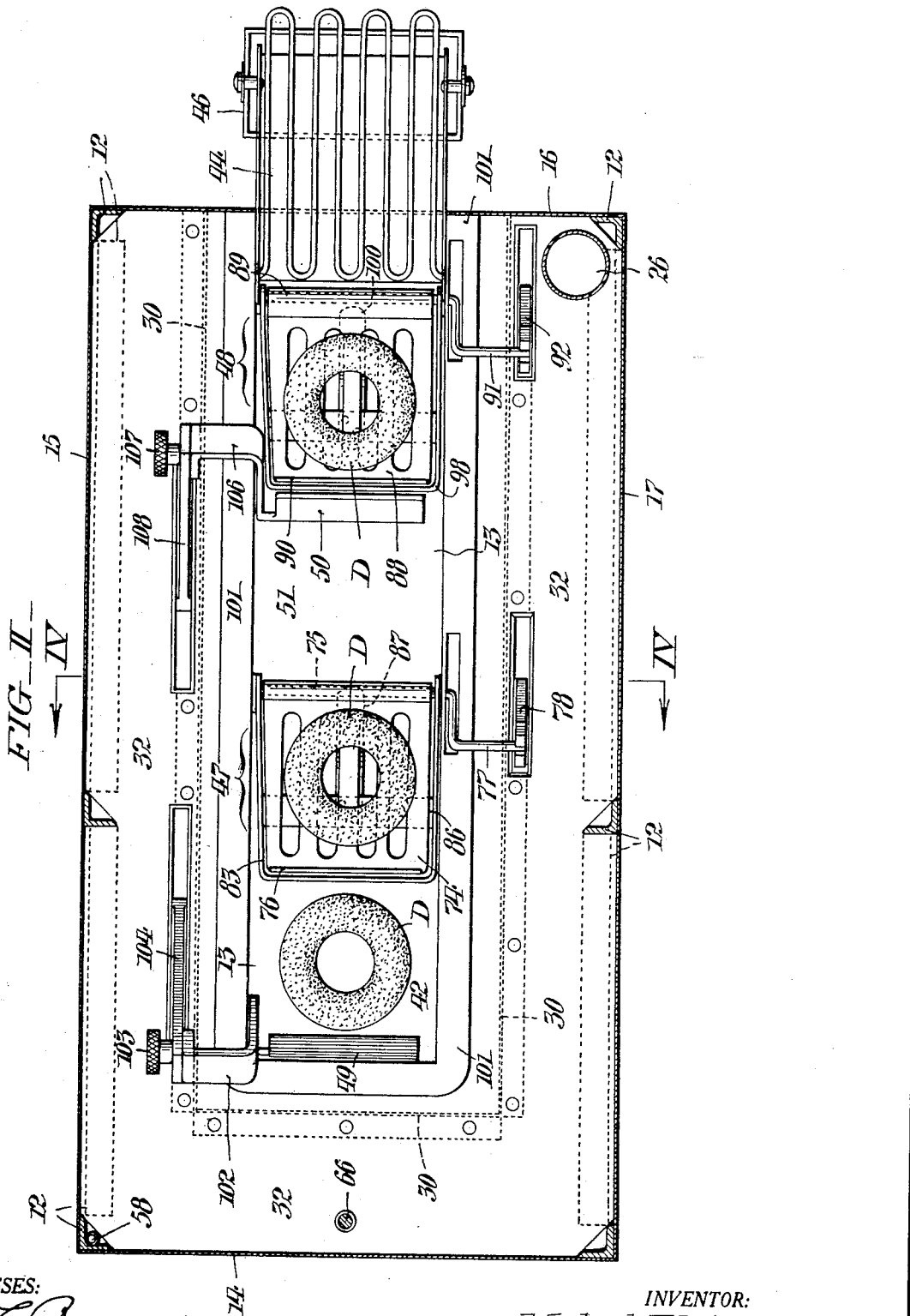

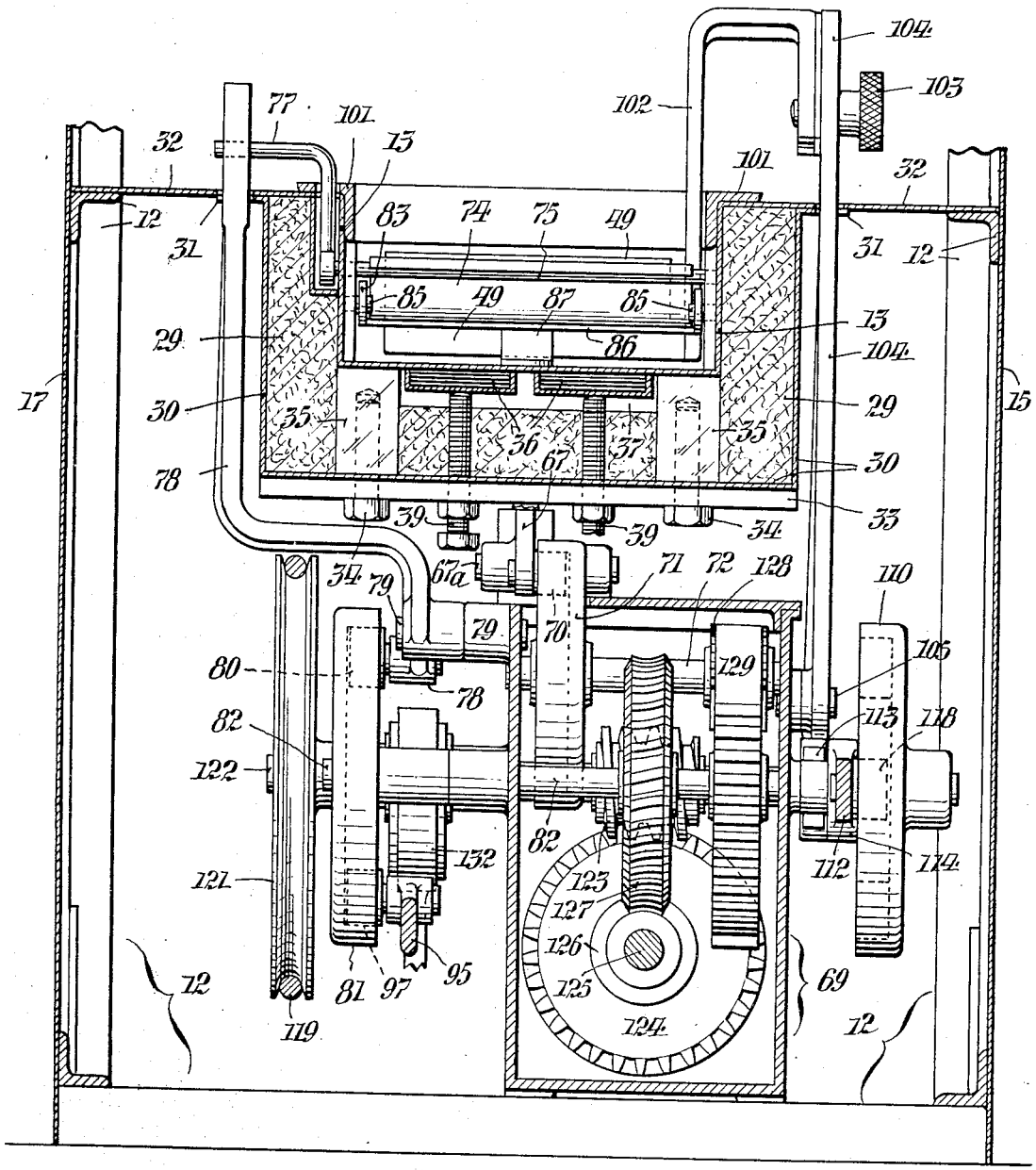

Dec. 24, 1935.  H. T. HUNTER  2,025,685
COOKING MACHINE
Filed Feb. 7, 1933   8 Sheets-Sheet 5
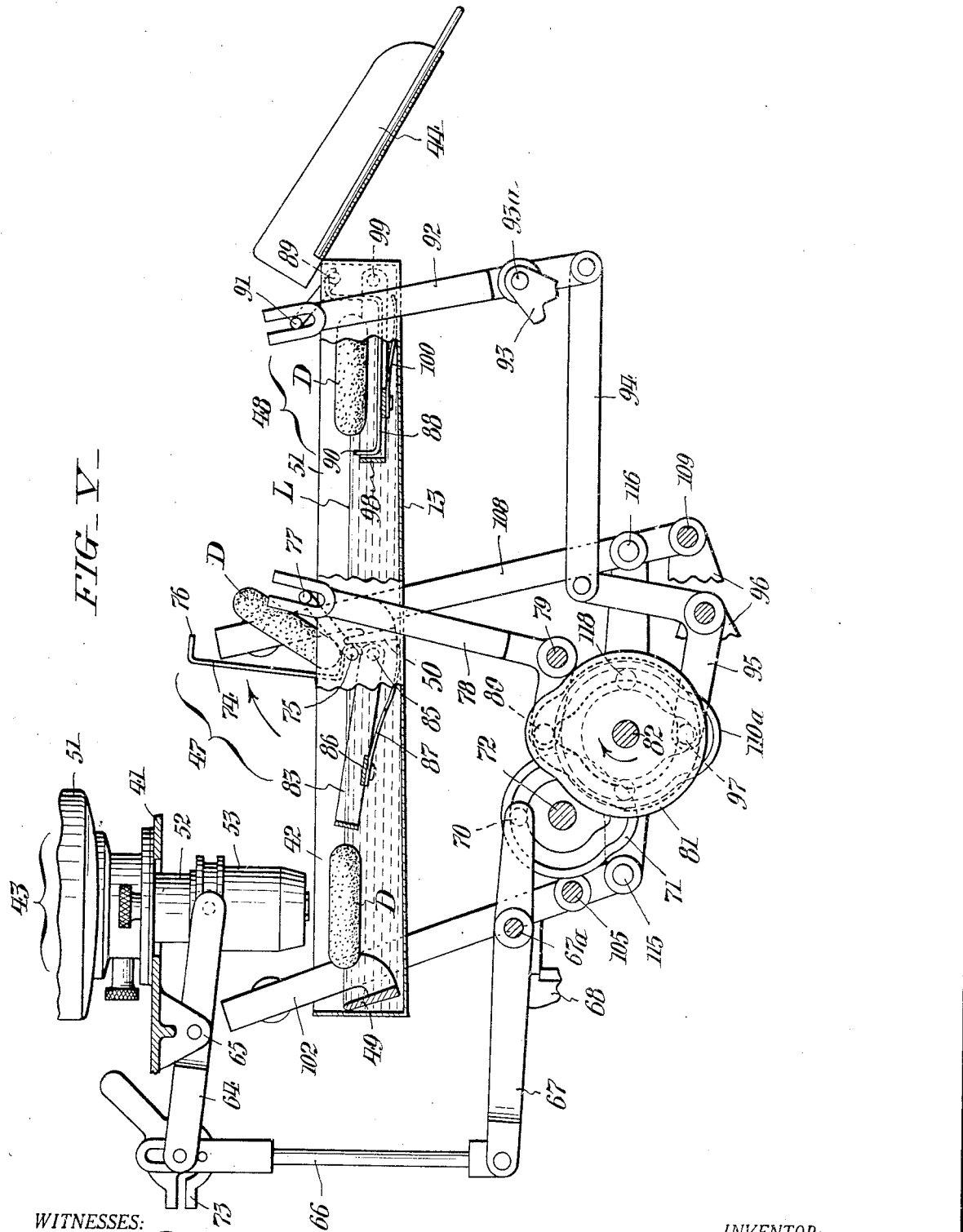
WITNESSES:
John C. Bergner
Hubert Fuchs
INVENTOR:
Herbert T. Hunter
BY Fraley Paul
ATTORNEYS.

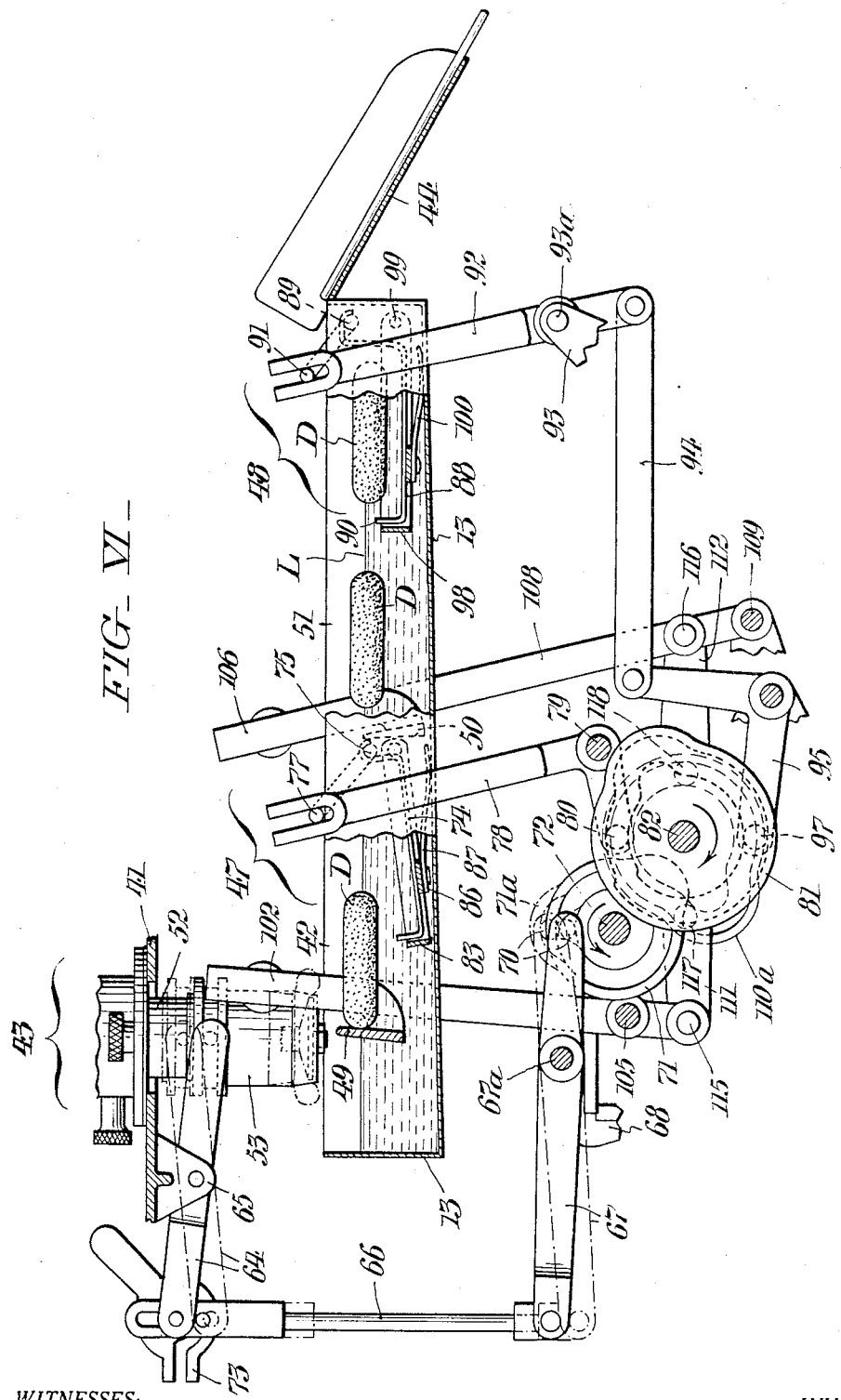

Dec. 24, 1935.   H. T. HUNTER   2,025,685
COOKING MACHINE
Filed Feb. 7, 1933   8 Sheets-Sheet 7
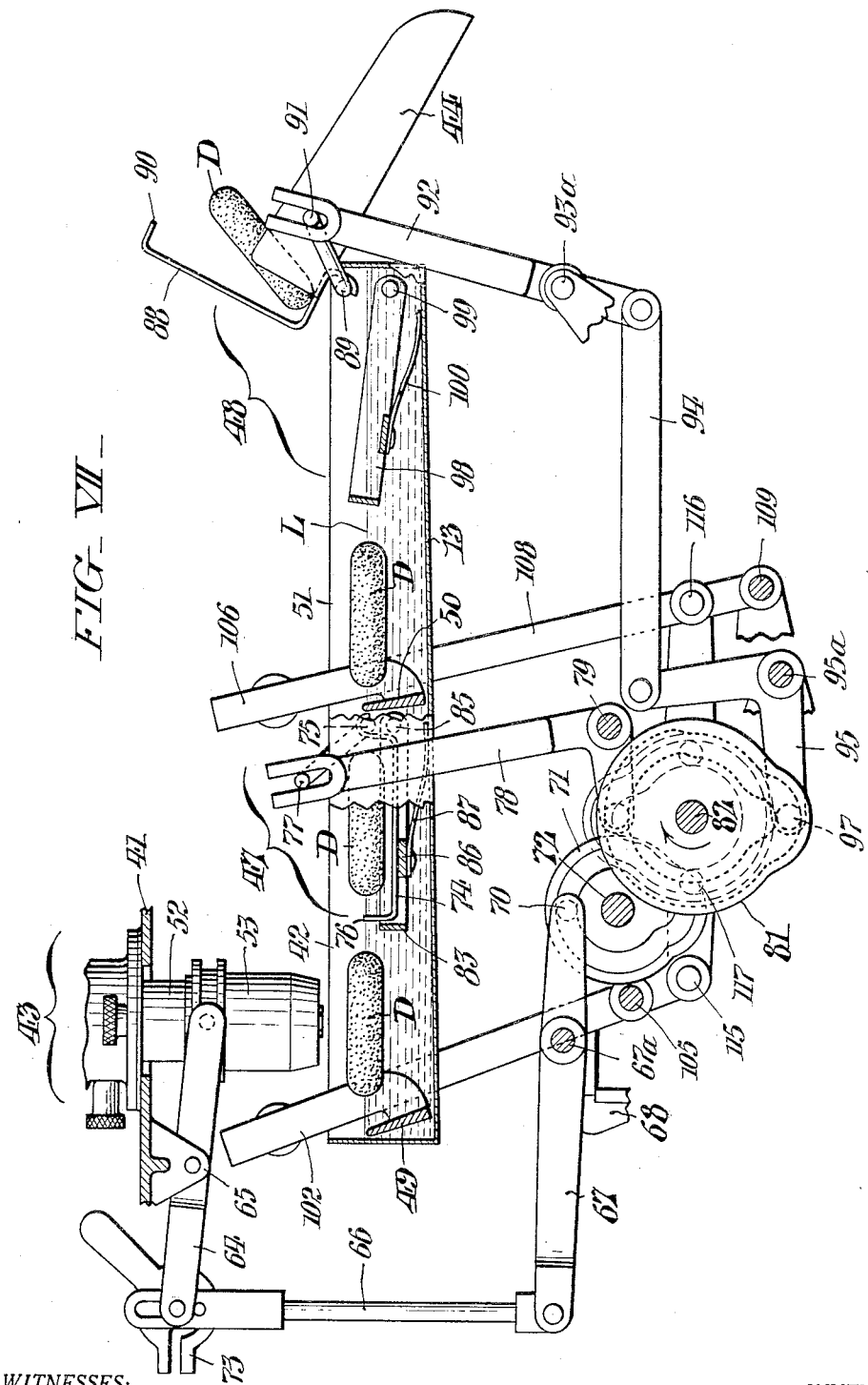

Dec. 24, 1935. H. T. HUNTER 2,025,685
COOKING MACHINE
Filed Feb. 7, 1933 8 Sheets-Sheet 8
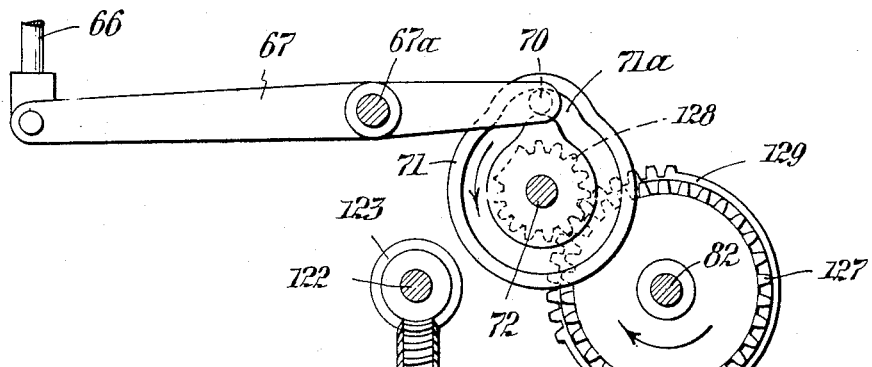
FIG. VIII
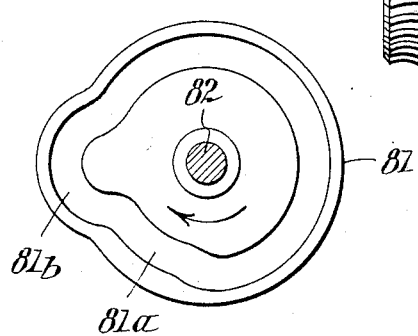
FIG. X
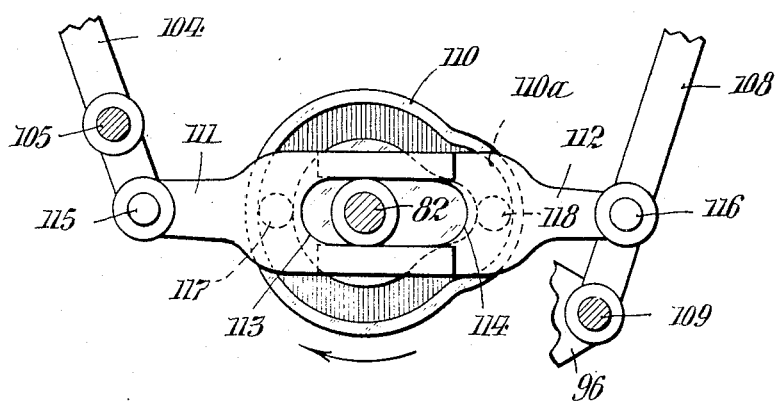
FIG. IX
WITNESSES:
John C. Bergner
Hubert Fuchs
INVENTOR:
Herbert T. Hunter,
BY Fraley & Paul
ATTORNEYS.

Patented Dec. 24, 1935

2,025,685

UNITED STATES PATENT OFFICE 2,025,685

COOKING MACHINE

Herbert T. Hunter, Baltimore, Md., assignor to Doughnut Machine Corporation, New York, N. Y., a corporation of New York Application February 7, 1933, Serial No. 655,553

3 Claims. (Cl. 219—19)

This invention relates to automatic machines for cooking articles such as doughnuts in hot liquor; and it has more particular reference to doughnut cooking machines of the straight-away type such as featured in U. S. Patent No. 1,823,146 granted to me on September 15, 1931, wherein raw doughnuts are successively released by a forming means to drop into one end of an elongate receptacle containing the cooking liquor, turned over individually after being advanced along the receptacle afloat on one side in the liquor; and finally ejected individually from the machine after further advance along the receptacle floating on the other side in the liquor. The machine of the patent referred to was designed for use in wholesale bakeries to produce doughnuts in large quantities, up to three hundred dozen per hour, and accordingly entailed the installation of special service lines for supplying current to operate the electric equipment for maintaining hot the relatively large quantity of cooking liquor required as well as to actuate the comparatively heavy parts of its manipulating mechanism.

My present invention has for its chief aim the provision of a compact smaller and fool-proof automatic doughnut machine of the same general character suitable for display purposes on store counters or in the windows of retail shops, which requires a correspondingly smaller bulk of cooking liquor; which in its construction embodies simplified mechanism with light and easily actuated parts for manipulating the doughnuts during cooking and which can therefore be very economically operated by current at low voltage such as is obtainable from any ordinary electric light socket with consequent elimination of the special electric equipment heretofore necessary for the larger machine.

In connection with an automatic doughnut machine having the above described attributes it is a further object of my invention to provide for the successive actuation of the forming, manipulating and advancing means in timed relation such that the machine operates continuously and regularly to produce doughnuts which are uniformly cooked and evenly browned on both sides.

Still further objects and attendant advantages of this invention will be manifest from the detailed description following of the attached drawings wherein Fig. I shows a longitudinal sectional view of a doughnut machine incorporating the present improvements.

Fig. II is a plan section of the machine taken as indicated by the arrows II—II in Fig. I.

Fig. III is likewise a plan sectional view of the machine taken at a lower level as indicated by the arrows III—III in Fig. I.

Fig. IV is a transverse sectional view taken as indicated by the arrows IV—IV in Figs. I, II and III.

Figs. V, VI and VII are views corresponding to Fig. I showing the successive steps in the operative cycle of the machine.

Fig. VIII is a longitudinal sectional view taken as indicated by the arrows VIII—VIII in Fig. III of the transmission from which all the actuated parts of the machine derive their motion.

Fig. IX is a fragmentary detail sectional view taken as indicated by the arrows IX—IX in Fig. III showing the means relied on for actuating the elements by which the doughnuts are advanced in the machine at different stages of the cooking periods, and Fig. X is a detail view of one of the rotary cams embodied in the actuating mechanism.

As herein delineated, my improved doughnut machine comprises a frame 12 which, in the present instance, is constructed from angle iron, and is of generally oblong rectangular configuration. Supported horizontally within the frame 12, at about mid height of the latter, is a relatively shallow narrow elongated receptacle 13 fashioned from sheet metal and containing cooking liquor L which is maintained at the level shown, by suitable means not illustrated, the width of said receptacle being such as to define a single straightaway channel wherein the doughnuts indicated at D are progressed from left to right while afloat in the liquor during the cooking period. The portion of the frame 12 below the cooking receptacle 13 is closed in by sheet metal panels 14, 15, 16 and 17, which form a compartment M for the drive mechanism of the machine, while the upper portion of the frame is closed in at the front by a sheet metal panel 18 and at the top, sides and rear by transparent panels 19, 20 and 21 of glass to form a cooking chamber C over the after or right-hand part of the receptacle. The machine is thus well adapted for display purposes, since all the manipulations of the doughnuts during cooking may be readily observed from the exterior. The receptacle 13 is drainable through a pipe 22 at the left hand end thereof, under the control of a wrench-operated valve 23. As shown, this valve 23 is accessible through a door protected opening 24 in the front end wall panel 14 of the machine, and is fitted with a hinged spout 25 capable of being swung downward and outward through said opening as shown in dot and dash lines in Fig. I when the receptacle is is to be drained. Fumes rising from the cooking liquor are drawn out of the compartment C through a vertical pipe 26 which extends downward and connects with a centrifugal suction blower 27 located in the lower compartment M and directly driven by an electric motor 28.

For the purposes of heat conservation and also to protect the mechanism within the compartment M below the receptacle 13, the latter is encased with relatively heavy thermo-insulation 29 which extends around the receptacle sides and across the bottom. As shown, this insulation is retained by a box-like sheathing 30 of sheet metal having a flange 31 around the top thereof to abut the underside of an outward perimetric flange 32 at the top of the receptacle 13. The sheathing 30 is supported and held in place by means of an underslung cross bar 33 which is secured by means of screw bolts 34 that take into a pair of lug blocks 35 welded or otherwise secured in transverse spaced relation to the bottom of the receptacle substantially at the center.

For heating the cooking liquor L I employ a pair of conventional electric strip heater units 36 which extend side by side lengthwise centrally of the bottom of the receptacle 13 in an interspace 37 provided for them in the insulation. During assembling of the machine, the heating units 36 are slipped into the interspace 37 from one end of the latter until they abut an angle stop 38 secured crosswise of the bottom of the receptacle 13 near the left hand end of the latter, and clamped tightly against the exposed portion of the receptacle bottom by means of screw bolts 39 passing up through the bar 33. Electric current is supplied, under control of a suitable thermostatic regulator for automatic maintenance of the cooking liquor L at a predetermined temperature, to terminals 40 at one end of the heater 36, see Fig. I. This thermostatic control forms no part of the present invention and has therefore been omitted from the drawings. The heating units 36 may be of any approved type capable of operating with a small amount of current at a voltage available from any ordinary electric light socket.

Detachably supported by a horizontal plate 41 above the exposed clear space 42 of the receptacle 13 at the left hand end of the machine, is an intermittently-operated forming device 43 capable of successively releasing individual raw doughnuts to drop horizontally into the receptacle; and at the opposite end of the machine there is provided a delivery chute 44 for directing the cooked doughnuts, after ejection, through a discharge opening 45 in the rear glass panel 21 of the cooking chamber C, to a receiving tray or basket, not illustrated. A removable trough 46 hung to the outer end of the chute 44 serves to catch the excess cooking fluid thrown off by the doughnuts during ejection.

A manipulating device 47 located at an intermediate point in the receptacle 13 serves to turn over the individual doughnuts, after floating on one side in the liquor L during the initial stage of the cooking period, to float on the other side during the final stage of the cooking period. At the expiration of the cooking period another manipulating device 48 lifts the doughnuts individually from the liquor and ejects them through the discharge opening 45 and onto the delivery chute 44. To advance the doughnuts individually from the clear space 42 beneath the forming device 43 to the turnover device 47 there is provided a progressing member 49. A similar progressing member 50 serves to advance the turned doughnuts individually from a clear space 51 beyond the turnover device 47 to the ejecting device 48. As later on explained, the turning, ejecting and advancing devices 47, 48, 49 and 50 just referred to are operated in timed relation such that a fully cooked doughnut is discharged from the machine for each raw doughnut introduced, the timing being such as to determine, in this instance, a capacity of approximately two doughnuts per minute for the machine.

The illustrated forming device is of a well known type consisting of a cylindrical dough hopper 51 with a tubular discharge neck 52 at the bottom. Slidable up and down on the neck 52 of the dough hopper 51 is a cutter sleeve 53 having its lower edge sharpened to shear with a fixed cutter disk 54 which is supported by an axial stem 55 within said neck. When the sleeve 53 is raised as shown in dotted lines in Fig. VI, there is formed between it and the disk 54, an annular die opening through which the dough is expressed under pressure. Upon descent of the cutter sleeve 53 to the position shown in Fig. I, the extruded dough is severed, and accordingly released as a ring to drop horizontally by gravity into the receptacle 13. The dough within the hopper is subject to the pressure of compressed air supplied from a tank 57 in one corner of the machinery compartment through a pipe 58 which extends upward from said tank to a fitting 59 above the supporting plate 41. From thence, the compressed air is conducted to the dough hopper 51 through a flexible tube 60 which connects with a nipple on the removable lid 61 of said hopper. Interposed in the piping just described is a pressure gage 62 and a regulatable automatic valve 63 capable of maintaining a predetermined pressure of the air. The sleeve 53 of the cutter die mechanism is actuated by means including a lever 64 which is fulcrumed at the center to a depending ear 65 of the supporting plate 41 and connected by a vertical drop link 66 to another lever 67 within the compartment M. This second lever 67 is likewise fulcrumed intermediate its ends at 67a to a bracket 68 on the casing of a transmission 69 from which all the moving parts of the apparatus are actuated. At its free end the lever 67 carries a roller 70 which engages a face groove in a rotary cam 71 affixed to a shaft 72 embodied in the transmission 69, said cam having a single rise at 71a, see Fig. VIII. A swingable latch member indicated at 73 in Fig. I makes it possible to operatively disconnect the lever 64 from the link 66 for maintenance of the sleeve 53 in its down position to cover the annular die opening of the forming device 43 when desired or required without necessitating stoppage of the driving mechanism of the machine.

The turnover device 47 comprises a hand 74 which is normally submerged horizontally in the cooking liquid and secured to a positionally fixed shaft 75. At its swinging end, the hand 74 has an upturned flange 76 which normally projects above the liquor to prevent the doughnuts from floating rearward after having once been advanced to the position above said hand by the progressing member 49. To the shaft 75 of the turnover hand 74 is secured, at one end, a crank 77 which outwardly overreaches the top of the receptacle 13 at the side nearest the observer in Fig. I (see also Fig. IV) to engage the bifurcated upper end of a bell crank rocker arm 78. This arm 78 is fulcrumed on a stud projection 79 on the casing of the transmission 69, and in its horizontal extremity carries a roller 80 in engagement with a face groove of a rotary cam 81 above a shaft 82 of said transmission to which shaft the cam is secured. The cam 81, it will be noted from Fig. X, has a depression 81a and a rise 81b, so that during each revolution of the shaft 82, the hand 74 is first lowered to permit advance of a doughnut over it as shown in Fig. VI and thereafter swung upward to the position shown in Fig. V so as to transfer the doughnut inverted to the clear space 51. Associated with the turn-over hand 74 is a stop member 83 having the form of a bale with its extremities fulcrumed on positionally fixed studs 85, see Fig. IV. Crosswise of the bottom of the yoke stop member 83 is a bar 86 to which is secured a leaf spring 87. Concurrently with the upward swinging movement of the turnover hand 74, as shown in Fig. V, the spring 87 acts to raise the stop member 83, thereby to prevent the doughnut in the clear space 42 from accidentally floating into the province of the turnover and from being mutilated by the hand 74 during its back swing.

The ejector device 48 is generally similar to the turnover in that it comprises a hand 88 which is secured to a positionally fixed cross shaft 89, and formed at its free end with a stop flange 90. The shaft 89 of the ejector hand 88, it will be noted, is at a higher level than that of the turnover so that incident to upward swinging movement of said ejector hand the doughnut is raised to the level of the delivery chute 44 as shown in Fig. VII. The crank arm 91 of the ejector shaft 89 is engaged in the bifurcated upper end of a vertical rocker arm 92 which is fulcrumed on a stud 93a supported by a bracket 93 reaching angularly upward from the casing of the blower 27. The lower end of the lever 92 is coupled by means of a horizontal link 94 with one arm of a bell crank lever 95 fulcrumed at 95a to a bracket 96 at the right hand end of the casing of the transmission 69. The other arm of this bell crank lever 95 carries a roller 97 which engages the face groove of the cam 81 below the shaft 82 or at a point one hundred and eighty degrees from the roller 80 mentioned in connection with the turnover device 47. The turnover and ejecting devices 47 and 48 are thus operated in exactly the same way but in alternation. A bale-like stop member 98 similar to the one previously described has its extremities fulcrumed on positionally fixed studs 99, and has attached to it, a leaf spring 100, which, as the ejector hand 88 is swung upward, causes said stop member to be elevated to the position of Fig. VII to prevent doughnuts from floating accidentally from the clear space 51 into the province of the ejector while the hand 88 is raised, see Fig. VII. The swinging axes 75 and 89 of the turnover and ejector hands 74 and 88, as well as the pivot studs 85 and 99 for the stop members 83 and 98 respectively associated with said hands, are all supported by an angle iron frame 101 fitting the cooking receptacle 13 and having its lateral perimetric flange resting on the top of said receptacle as shown in Figs. I, II and IV. This construction not only facilitates assembling of the machine initially, but permits bodily removal of the turnover and ejector devices 47 and 48 for convenience of cleaning the receptacle 13 from time to time, the cranks 77 and 91 lifting readily upward out of the bifurcations of the rocker arms 78 and 92.

The advancing member 49 has the form of a blade which extends transversely of the receptacle 13, and which is formed at one end with an upward and outward angular extension 102. This extension 102 overreaches the receptacle at the side remote from the observer in Fig. I and is adjustably secured by means of a thumb screw 103 to the upper end of a rocker arm 104 fulcrumed at 105 on the casing of the transmission 69. The advancing member 50 is similar to the advancing member 49 in that it is formed with an upward and outward angular extension 106, and like the latter, adjustably secured by means of a thumb screw 107 to the upper end of a vertical rocker arm 108 also at the remote side of the machine in Fig. I, said rocker arm being fulcrumed at its lower end to the bracket 96 at 109. The advancing devices 49 and 50 receive motion alternately and contrariwise from another rotary cam 110 on the shaft 82 through means including a pair of overlapping horizontally reciprocating members 111, 112, whereof the inner ends are bifurcated as at 113, 114 for sliding guidance by said shaft and the outer ends respectively connected pivotally to the levers 104, 108 at 115, 116, see Figs. I, III and IX. Rollers 117, 118 on the reciprocating members 111 and 112 engage the face groove of the cam 110, at diametrically-opposite points, said cam having, as shown in Fig. IX, but a single rise at 110a. Attention is directed to the fact here that the cams 81 and 110 are set on the shaft 82 with their rises in opposed relation from which it follows that the advancing devices 49 and 50 are operated in alternation with each other as well as in alternation with the turnover and ejecting devices 47 and 48.

The transmission 69 is driven at a reduced speed through a belt 119 connecting a small pulley 120 on the shaft of the motor 28 with a larger pulley 121 on the power shaft 122 of said transmission. Mounted on the shaft 122 within the casing of the transmission 69 is a worm gear 123 by which motion is communicated at further reduced speed to an intermeshing worm wheel 124 to a longitudinal shaft 125 of the transmission. The shaft 125 in turn carries a worm gear 126 by which motion is transmitted at still more reduced speed to a worm gear 127 on the main cam shaft 82 of the transmission. The shaft 72 carrying the cam 71 for actuating the doughnut forming device 43 is rotated intermittently through coaction of a mutilated pinion 128 thereon with a mutilated larger drive gear 129 on the constantly rotating main cam shaft 82 of the transmission. The ratio between the mutilated gears 128, 129 is such that a rapid movement is imparted to the cam shaft 72 once for each rotation of the main cam shaft 82 whereby, at the proper time, the cutting sleeve 53 of the forming device 43 is given a quick cutting motion to prevent the doughnuts from clinging to the die mechanism. A continuous supply of compressed air for the forming device 43 is maintained by means of a pump 130 which is supported by a bracket 131 secured to the left hand end of the casing of the transmission 69 and operated by an eccentric 132 on the drive shaft 122 of the transmission, said pump being connected with the compressed air supply reservoir 57 by means of a pipe shown at 133.

Through setting of the various rotary cams embodied in the actuating mechanism as hereinbefore set forth, there is predetermined a cooking cycle in which a raw formation is released to drop into the receptacle 13 at the feed end by the forming device 43 as shown in Fig. I; the turnover device 47 next actuated as shown in Fig. V to turn a doughnut previously placed thereover by the advancing means 49 and to transfer it to the clear space 51; a raw doughnut next advanced to the turnover device 47 as shown in Fig. VI; and a cooked doughnut next discharged onto the delivery chute 44 as shown in Fig. VII. This prescribed sequence of operations in the cooking cycle makes possible the compact construction which characterizes my new doughnut machine, the timing of the steps being such as to insure thorough cooking of the doughnuts and even browning of their opposite sides. The machine is accordingly especially advantageous in retailing establishments where a small output is desired and where the machine can be used for display purposes on the shop counter or in the show window to stimulate sale of the product.

Having thus described my invention, I claim:

1. The combination of a receptacle for cooking liquor, a jacket of thermo-insulation covering the side walls and bottom of the receptacle but affording an interspace in which the bottom is exposed; an exterior metal sheathing enclosing the insulation and secured to the receptacle; electrical heating means in said interspace; and means independent of that securing the metal sheathing to the receptacle extending through the bottom sheathing and holding said heating means against the receptacle bottom in said interspace.

2. The combination of an elongate rectangular receptacle for the cooking liquor; a jacket of thermo-insulation covering the four sides and the bottom of the receptacle with provision of a central longitudinal interspace in which a portion of the receptacle bottom is exposed; an exterior metal sheathing enclosing the insulation, and secured to the receptacle a number of electric bar heating units disposed within the longitudinal interspace aforesaid; and means extending through the bottom sheathing for holding said bar heating units in contact with the exposed portion of the receptacle bottom.

3. The combination of an elongate rectangular receptacle for the cooking liquor; a jacket of thermo-insulation covering the four sides and bottom of the receptacle with provision of a longitudinal interspace in which a portion of the receptacle bottom is exposed; a conformative box-like exterior sheathing of sheet metal for retaining the thermo-insulation; means for supporting the sheathing including a cross bar secured to laterally spaced lugs depending from the bottom of the receptacle substantially at the center; a number of electric bar heater units within the longitudinal interspace of the insulation; and screws engaged in the cross bar aforesaid and clamping the individual heating units to the exposed portion of the receptacle bottom.

HERBERT T. HUNTER.